United States Patent [19]
Azegami et al.

[11] Patent Number: 5,956,189
[45] Date of Patent: Sep. 21, 1999

[54] LINEAR GUIDING MECHANISM OF A ZOOM LENS BARREL

[75] Inventors: Kazuyoshi Azegami, Tokyo; Takamitsu Sasaki, Saitama; Kazunori Ishizuka, Kanagawa, all of Japan

[73] Assignee: Asahi Kogaku Kogyo Kabushiki Kaisha, Tokyo, Japan

[21] Appl. No.: 09/176,965

[22] Filed: Oct. 22, 1998

[30] Foreign Application Priority Data

Oct. 24, 1997 [JP] Japan ..................................... 9-292576

[51] Int. Cl.⁶ .............................. G02B 7/02; G02B 15/14
[52] U.S. Cl. ............................................ 359/823; 359/704
[58] Field of Search ................................... 359/819, 823, 359/824, 700, 703, 704; 396/87

[56] References Cited

U.S. PATENT DOCUMENTS

| | | | |
|---|---|---|---|
| 4,717,933 | 1/1988 | Ando et al. | 354/409 |
| 5,515,129 | 5/1996 | Miyazawa et al. | 354/400 |
| 5,600,397 | 2/1997 | Shiokama | 354/400 |
| 5,737,644 | 4/1998 | Nomura et al. | 396/72 |
| 5,748,388 | 5/1998 | Nomura et al. | 359/700 |

*Primary Examiner*—Georgia Epps
*Assistant Examiner*—Ricky Mack
*Attorney, Agent, or Firm*—Greenblum & Bernstein P.L.C.

[57] ABSTRACT

Disclosed is a linear guiding mechanism of a zoom lens barrel which includes: a first cylindrical member provided on an inner periphery thereof with at least one linear guide groove which extends parallel to an optical axis, a code sheet for detecting a focal length being fixed to an outer periphery of the first cylindrical member; and a second cylindrical member provided on an outer surface thereof with at least one guide projection which is fitted in the at least one linear guide groove, respectively, wherein at least part of the code sheet and at least part of the at least one linear guide groove are located at the same position in a circumferential direction of the code sheet, and wherein each of the at least one linear guide groove includes a raised portion which is radially raised from the base of the linear guide groove towards the optical axis.

11 Claims, 6 Drawing Sheets

LINEAR GUIDING MECHANISM OF A ZOOM LENS BARREL

BACKGROUND OF THE INVENTION

1. Field of the Invention

The present invention relates to a zoom lens barrel, and more particularly to a linear guiding mechanism of a zoom lens barrel.

2. Description of the Related Art

A zoom lens barrel that is provided with at least one extending barrel which extends out forwardly while rotating to effect zooming is known. Such a zoom lens barrel is generally provided with a linear guiding mechanism for connecting two barrels, one of which is fitted onto the other, while guiding one of the two barrels relative to the other in an axial direction (i.e., in an optical axis direction) without allowing the one barrel to rotate relative to the other barrel. The linear guiding mechanism is generally comprised of a plurality of linear guide grooves and a corresponding plurality of guide projections which are formed on an inner periphery of the outer barrel and an outer periphery of the inner barrel, respectively. Each linear guide groove has a predetermined depth in a radial direction so as to receive a corresponding guide projection therein. In the case where the zoom lens barrel is provided with a focal length detecting device including a code sheet for detecting a focal length and a conductive brush which slidably contacts the code sheet, the code sheet is often provided to be fixed to the periphery of the barrel having the plurality of linear guide grooves.

FIG. 7 shows two barrels (an outer barrel 100 and an inner barrel 105) in a conventional zoom lens barrel which are connected to each other through a linear guiding mechanism comprised of a plurality of linear guide grooves 101 (there is only one of them seen in FIG. 7) and a corresponding plurality of guide projections 106 (there is only one of them seen in FIG. 7). The outer barrel 100 is provided with a circumferential recess 103 for receiving a code plate 102 therein. The code plate 102 is fixed to the base of the recess 103 therealong. As can be seen from FIG. 7, the circumferential recess 103 is formed on the outer barrel 100 to cross the linear guide groove 101 (which extends in a direction perpendicular to the circumferential recess 103) in a circumferential direction. In other words, the circumferential recess 103 and the linear guide groove 101 are formed on the outer periphery and inner periphery of the outer barrel 100, respectively, so that part of the circumferential recess 103 and part of the linear guide groove 101 are located at the same position in a circumferential direction.

Each linear guide groove 101 has substantially a rectangular cross section and therefore has a uniform depth, and a corresponding guide projection 106 formed on the outer periphery of the inner barrel 105 is fitted in the groove 101. With the linear guide grooves 101 and the corresponding guide projection 106, the outer and inner barrels 100 and 105 can move along the axial direction relative to each other without any relative rotation therebetween.

It is necessary for a portion of the outer barrel 100 between the circumferential recess 103 and each linear guide groove 101 to have an enough thickness so as to achieve sufficient strength thereof. If the portion of the inner barrel 100 between the circumferential recess 103 and each linear guide groove 101 is not thick enough, the portion cannot achieve sufficient strength, which may cause the portion to warp when a conductive brush (not shown in FIG. 7) slides on the code plate 102. However, in order to ensure a connection between each linear guide groove 101 and the corresponding guide projection 106, a sufficient amount of engagement therebetween must be secured, and the depth of each linear guide groove 101 must be more than a predetermined depth. Accordingly, in order to achieve sufficient strength at each portion of the inner barrel 100 between the circumferential recess 103 and the linear guide grooves 101, the inner barrel 100 needs to be formed so as to have a sufficient thickness thereat, which is disadvantageous in regard to obtaining a small and compact designed zoom lens. In the conventional zoom lens barrel shown in FIG. 7, it is possible for the circumferential groove 103 not to be formed, and the code sheet 102 can be directly fixed onto the outer periphery of the outer barrel 100. In this case, it is also difficult to achieve sufficient strength at each portion of the inner barrel 100 between the outer periphery thereof and the linear guide grooves 101 if the outer barrel 100 is formed thin.

SUMMARY OF THE INVENTION

It is an object of the present invention to provide a linear guiding mechanism of a zoom lens barrel for connecting two barrels, one of which is fitted onto the other, and for guiding one of the two barrels relative to the other in an axial direction without allowing one barrel to rotate relative to the other barrel, wherein the linear guiding mechanism makes it possible for the outer barrel to have a small thickness to thereby contribute to the miniaturization of the zoom lens barrel.

According to an aspect of the present invention, there is provided a linear guiding mechanism of a zoom lens barrel which includes: a first cylindrical member provided on an inner periphery thereof with at least one linear guide groove which extends parallel to an optical axis, a code sheet for detecting a focal length being fixed to an outer periphery of the first cylindrical member; and a second cylindrical member provided on an outer surface thereof with at least one guide projection which is fitted in the at least one linear guide groove, respectively, wherein at least part of the code sheet and at least part of the at least one linear guide groove are located at the same position in a circumferential direction of the code sheet, and wherein each of the at least one linear guide groove includes a raised portion which is radially raised from the base of the linear guide groove towards the optical axis.

Preferably, each of the at least one guide projection includes a concave portion, the shape of which corresponds to the raised portion.

Preferably, each of the at least one linear guide groove has a substantially M-shaped profile in cross-section along a plane extending perpendicularly to the optical axis.

Preferably, each of the at least one linear guide groove has a uniform cross-section in the direction of the optical axis.

The first cylindrical member may include a circumferential recess formed on the outer periphery of the first cylindrical member, the code sheet being fixed to the base of the circumferential recess therealong.

According to another aspect of the present invention, there is provided a linear guiding mechanism of a zoom lens barrel for guiding a second barrel relative to a first barrel in a direction of an optical axis without allowing the second barrel to rotate about the optical axis relative to the first barrel, wherein the second barrel includes a plurality of guide projections each extending radially in a direction apart from the optical axis, and wherein the first barrel includes: a plurality of linear guide grooves formed on an inner periphery of the first barrel to extend in the optical axis direction; a circumferential groove formed on an outer periphery of the first barrel along a circumference of the first barrel, the plurality of guide projections being respectively fitted in the plurality of linear guide grooves in a slidable manner in a direction of the optical axis; and a code sheet for detecting a focal length being fixed to a bottom of the circumferential groove therealong, wherein at least part of the circumferential groove crosses at least part of each of the plurality of linear guide grooves in a circumferential direction, and wherein each of the plurality of linear guide grooves includes a raised portion which is radially raised from the base of the linear guide groove towards the optical axis.

According to still another aspect of the present invention, there is provided a linear guiding mechanism of a zoom lens barrel which includes: a first cylindrical member provided on an inner periphery thereof with a plurality of linear guide grooves extending parallel to an optical axis, a code sheet for detecting a focal length being fixed to an outer periphery of the first cylindrical member; and a second cylindrical member provided on an outer surface thereof with a corresponding plurality of guide projections which are fitted in the plurality of linear guide grooves, respectively; wherein at least part of the code sheet crosses at least part of each of the plurality of linear guide grooves in a circumferential direction, and wherein each of the plurality of linear guide grooves includes a raised portion which is radially raised from the base of the linear guide groove towards the optical axis.

The present disclosure relates to subject matter contained in Japanese Patent Application No. 09-292576 (filed on Oct. 24, 1997) which is expressly incorporated herein by reference in its entirety.

BRIEF DESCRIPTION OF THE DRAWINGS

The present invention will be discussed below in detail with reference to the accompanying drawings, in which.

DESCRIPTION OF THE PREFERRED EMBODIMENT

Figure 1:
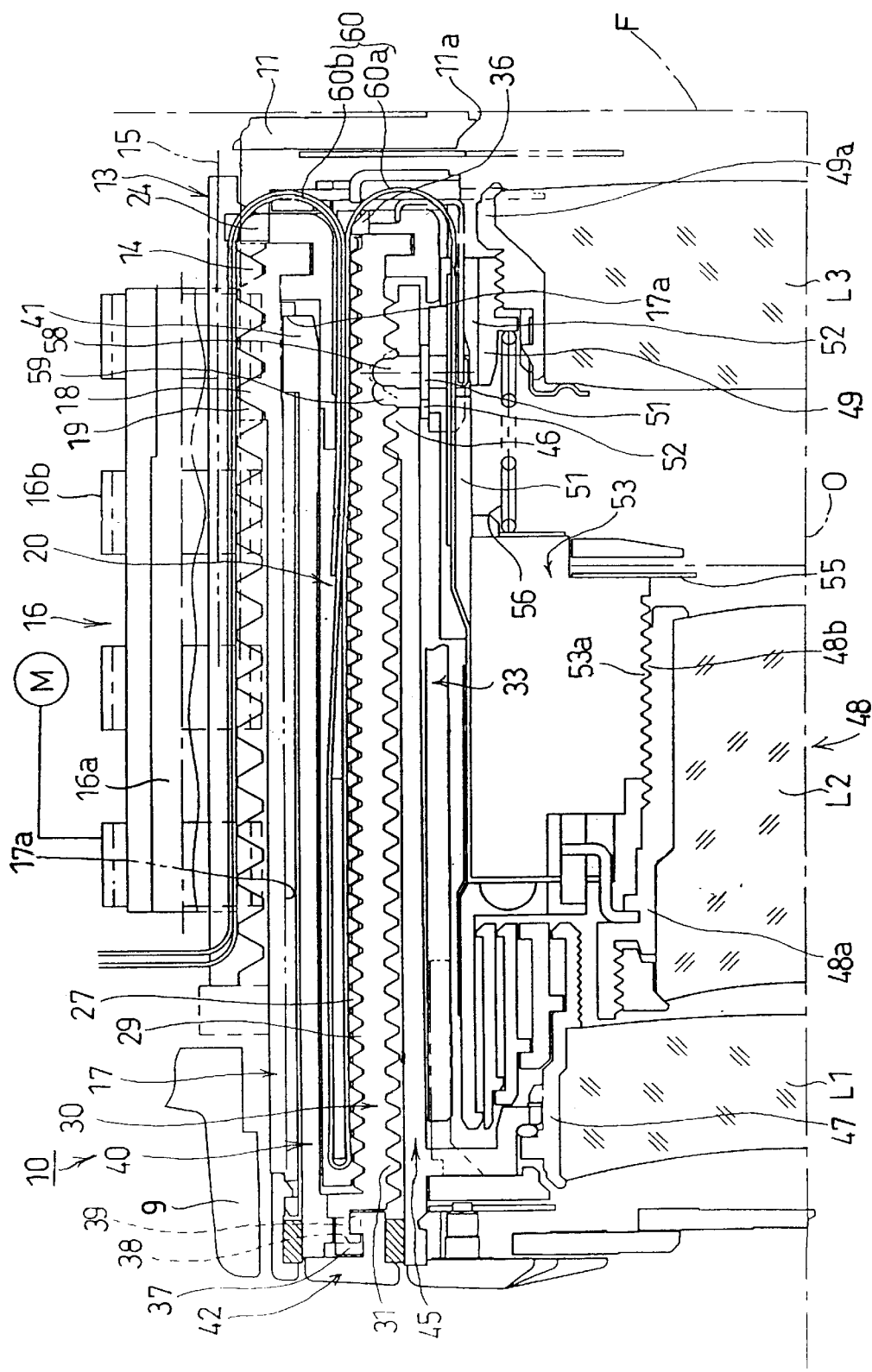
FIG. 1 is a longitudinal sectional view of a zoom lens barrel in a retracted position, according to an embodiment of the present invention.

FIGS. 1 though 4 show an embodiment of a zoom lens barrel 10 to which the present invention is applied. The zoom lens barrel 10 is fixed to a camera body 9 of a compact camera. The zoom lens barrel 10 is of a telescoping type having an first outer barrel (outer movable barrel) 17, a second outer barrel (middle movable barrel) 40 and a third outer barrel (inner movable barrel) 45 arranged in this order from an optical axis O so that the zoom lens barrel 10 can extend and retract in the direction of the optical axis O to vary the focal length. The zoom lens barrel 10 is provided with a photographic optical system consisting of a first lens group L1, a second lens group L2 and a third lens group L3. Each lens group is moved along the optical axis O relative to a film surface F while varying the respective distances thereamong to effect zooming. The second lens group L2 is moved along the optical axis O for focusing, i.e., for bringing a subject into focus. The overall structure and operation of the zoom lens barrel 10 will be hereinafter discussed.

An aperture plate 11 having a rectangular opening 11a at its center is secured to the camera body 9. The rectangular opening 11a forms the limits of each frame exposed. A stationary barrel 13 is secured to the camera body 9 in front of the aperture plate 11. The stationary barrel 13 is provided on its inner peripheral surface with a female helicoid 14 and three linear guide grooves 15 which extend in parallel with the optical axis O and which are circumferentially spaced from one another. Note that only one of the three linear guide grooves 15 is shown in FIG. 1.

The stationary barrel 13 is provided on its inner periphery with a recess 13a which extends in parallel with the optical axis O to receive a zoom gear 16 therein. The zoom gear 16 is provided with four pinion gears 16b integrally formed at regular intervals in the axial direction thereof. The zoom gear 16 is rotatably fitted on a rotational shaft 16a which extends in parallel with the optical axis O and whose front and rear ends are supported by the camera body 9 and the stationary barrel 13, respectively. Teeth of each pinion 16b partly projects into the inside of the stationary barrel 13 so as to mesh with a plurality of outer peripheral gears 19 formed on the first outer barrel 17. The drive force of a zoom motor M provided in the camera body 9 is transmitted to the zoom gear 16 through a reduction gear train (not shown).

First outer barrel 17 is fitted in the stationary barrel 13 so that a male helicoid 18 formed on the outer peripheral surface of the first outer barrel 17 is engaged with the female helicoid 14 of the stationary barrel 13. The width of the male helicoid 18 in the direction of the optical axis O is determined so that the male helicoid 18 does not dislodged from the stationary barrel 13 when the first outer barrel 17 is fully extended. The first outer barrel 17 is provided, on the outer peripheral surface thereof on which the male helicoid 18 is formed, with the aforementioned plurality of outer peripheral gears 19 each extending along threads of the male helicoid 18. The outer peripheral gears 19 stay in mesh with the zoom gear 16. The first outer barrel 17 is further provided on its inner peripheral surface with three grooves 17a (there is only one of them seen in FIG. 1) each extending in parallel with the optical axis O.

Figure 4:
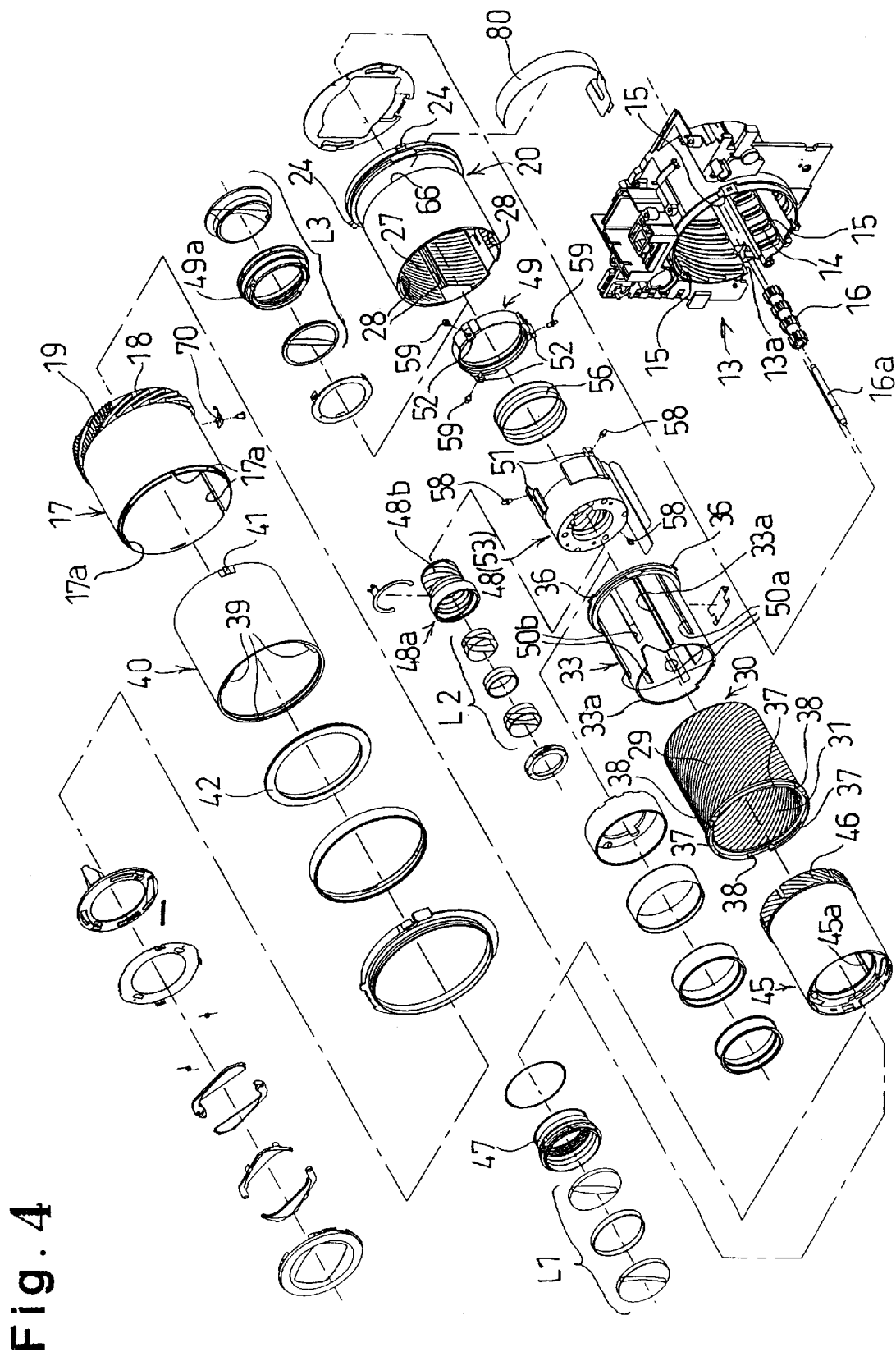
FIG. 4 is an exploded perspective view of the zoom lens barrel shown in FIG. 1.

A first linear movement guide ring (first cylindrical member) 20 is positioned inside the first outer barrel 17. The first linear movement guide ring 20 and the first outer barrel 17 are connected at their rear ends to be rotatable relative to each other about the optical axis O but without moving relative to each other along the optical axis O. The first linear movement guide ring 20 is provided at the rear end thereof with three guide projections 24 (there are only two of them seen in FIG. 4) at different circumferential positions. Each guide projection 24 projects outwardly in a radial direction. The guide projections 24 are fitted in the linear guide grooves 15 formed on the inner peripheral surface of the stationary barrel 13, respectively. Consequently, the first linear movement guide ring 20 is movable together with the first outer barrel 17 in the direction of the optical axial O without rotating relative to the stationary barrel 13 about the optical axis O. Namely, the first linear movement guide ring 20 is guided linearly in the direction of the optical axis O without rotating about the optical axis O relative to the stationary barrel 13.

A first extension stage of the zoom lens barrel 10 is composed of the first outer barrel 17 and the first linear movement guide ring 20. In the first extension stage, when the zoom gear 16 is rotated in a predetermined direction by the zoom motor M, the first outer barrel 17 is rotated through the zoom gear 16 and the outer peripheral gear 19, so that the first outer barrel 17 is advanced from the stationary barrel 13 in accordance with the relationship between the female helicoid 14 and the male helicoid 18. At the same time, the first linear movement guide ring 20 is moved together with the first outer barrel 17 relative to the stationary barrel 13 in the direction of the optical axis O while being linearly guided.

The first linear movement guide ring 20 is provided on its inner peripheral surface with a female helicoid 27 whose direction of inclination is the same as that of the female helicoid 14. The first linear movement guide ring 20 is also provided on its inner peripheral surface with three linear guide grooves 28 that extend in parallel with the optical axis O and that are spaced from one another at an equi-angular distance in the circumferential direction.

A drive cam ring 30 is fitted in the first linear movement guide ring 20 such that a male helicoid 29 formed on the outer peripheral surface of the drive cam ring 30 is in mesh with the female helicoid 27 of the first linear movement guide ring 20. The male helicoid 29 is formed entirely on the outer peripheral surface of the drive cam ring 30. The drive cam ring 30 is further provided on its entire inner peripheral surface with a female helicoid 31 whose direction of inclination is opposite to that of the male helicoid 29.

A second linear movement guide ring (second cylindrical member) 33 is positioned in the drive cam ring 30. The second linear movement guide ring 33 and the drive cam ring 30 are connected at their rear ends to be rotatable relative to each other about the optical axis O but without moving relative to each other along the optical axis O.

The second linear movement guide ring 33 is provided at the rear end thereof with three guide projections 36 at different circumferential positions. Each guide projection 36 projects outwardly in a radial direction. The three guide projections 36 are fitted in three linear guide grooves 28 formed on the inner peripheral surface of the first linear movement guide ring 20, respectively. Consequently, the second linear movement guide ring 33 is linearly guided in the direction of the optical axis O through the first linear movement guide ring 20, without rotating relative to the stationary barrel 13.

The second outer barrel 40 is positioned between the first outer barrel 17 and the first linear movement guide ring 20. The second outer barrel 40 is provided, on its outer peripheral surface at the rear end thereof, with three projections 41 (there is only one of them seen in FIG. 4) which are fitted in three grooves 17a (there is only one of them seen in FIG. 1) formed on the inner peripheral surface of the first outer barrel 17, respectively. Each groove 17a extends in parallel with the optical axis O. Through the engagement of the projections 41 with the grooves 17a, the second outer barrel 40 is not rotatable relative to the first outer barrel 17 about the optical axis O but is movable relative to the first outer barrel 17 in the direction of the optical axis O.

The drive cam ring 30 is provided at its front end thereof with a rib 37 having a predetermined thickness in the radial direction. The rib is provided with three cutaway portions 38. The second outer barrel 40 is provided, on its inner peripheral surface at the front end thereof, with three engaging projections 39 (there is only one of them seen in FIG. 1) that are respectively engaged in the cut-away portions 38 of the rib 37. Through the engagement of the engaging projections 39 with the cut-away portions 38, the drive cam ring 30 and the second outer barrel 40 are connected so as not to move relative to each other in the direction of the optical axis O nor rotate relative to each other about the optical axis O. A ring 42 is fixed at the front end the second outer barrel 40 so as not to disengage the engaging projections 39 from the cut-away portions 38.

Consequently, when the first outer barrel 17 rotates about the optical axis O in a rotational direction to advance from the stationary barrel 13, the second outer barrel 40 rotates together with the first outer barrel 17, so that the rotation of the first outer barrel 17 is transmitted to the drive cam ring 30 through the engaging projections 39 and the cut-away portions 38.

A second extension stage of the zoom lens barrel 10 is composed of the drive cam ring 30, the second linear movement guide ring 33 and the second outer barrel 40. When the first outer barrel 17, which is a fundamental element of the first extension stage of the zoom lens barrel 10, is driven to rotate and advance from the stationary barrel 13, the second outer barrel 40 rotates together with the first outer barrel 17 through the engagement of the grooves 17a and the projections 41. The drive cam ring 30 to which the rotation of the second outer barrel 40 is transmitted is advanced from the first linear movement guide ring 20 together with the second outer barrel 40, while rotating relative to the stationary barrel 13 in the same rotational direction as that of the first outer barrel 17, in accordance with the engagement of the female helicoid 27 with the male helicoid 29. At the same time, the second linear movement guide ring 33 is moved in the direction of the optical axis O together with the drive cam ring 30 while being guided by the first linear movement guide ring 20 in accordance with the engagement of the guide projections 36 with the linear guide grooves 28.

The third outer barrel 45 is fitted in the drive cam ring 30. The second linear movement guide ring 33 is fitted in the third outer barrel 45. The second linear movement guide ring 33 is provided on its outer peripheral surface with three guide rails 33a (there are only two of them seen in FIG. 4) each extending parallel with the optical axis O. The third outer barrel 45 is provided on its inner peripheral surface with three guide rails 45a (there is only one of them seen in FIG. 4) each extending parallel with the optical axis O. The guide rails 33a of the second linear movement guide ring 33 are slidably engaged with the guide rails 45a of the third outer barrel 45, respectively, to thereby linearly guide the third outer barrel 45 in the direction of the optical axis O relative to the second linear movement guide ring 33.

The third outer barrel 45 is provided on its outer peripheral surface at the rear end thereof with a male helicoid 46 which meshes with the female helicoid 31 of the drive cam ring 30. Since the third outer barrel 45 is linearly guided in the direction of the optical axis O by the second linear movement guide ring 33, when the drive cam ring 30 rotates while advancing, the third outer barrel 45 does not rotate with the drive cam ring 30 but is advanced from the drive cam ring 30 due to the engagement of the male helicoid 46 with the female helicoid 31. Accordingly, a third extension stage of the lens barrel is comprised of the third outer barrel 45. The width of the male helicoid 46 in the direction of the optical axis O is determined such that the male helicoid 46 is not externally exposed when the third outer barrel 45 is fully extended.

A first lens frame 47 which holds the first lens group L1 is secured to the third outer barrel 45 to be positioned thereinside.

The second linear movement guide ring 33 is provided with three guide slits 50a and three guide slits 50b which all extends in parallel with the optical axis O. The guide slits 50a are formed so as to guide the second lens group L2 while the guide slits 50b are formed so as to guide the third lens group L3. The guide slits 50a and 50b are alternately arranged in the circumferential direction.

The second lens group L2 is supported by a second lens frame 48a which is an element of a second lens group drive unit 48. The third lens group L3 is supported by a third lens frame 49a supported by a frame supporting ring 49. The second lens group drive unit 48 is provided with three sliding plates 51 (there are only two of them seen in FIG. 4) each extending in parallel with the optical axis O. The three sliding plates 51 are slidably fitted in the three guide slits 50a. Likewise, the frame supporting ring 49 is provided with three sliding plates 52 each extending in parallel with the optical axis O. The three sliding plates 52 are slidably fitted in the three guide slits 50b. Therefore, the second lens group drive unit 48, which includes the second lens frame 48a, and the frame supporting ring 49, which includes the third lens frame 49a, is movable, independent of each other, within the second linear movement guide ring 33 in the direction of the optical axis O. A compression spring 56 is positioned between the second lens group drive unit 48 and the frame supporting ring 49 so that a shutter block 53 and the third lens frame 49a are biased forward and rearward in the direction of the optical axis, respectively.

The second lens group drive unit 48 and the frame supporting ring 49 are moved relative to each other in the direction of the optical axis O in a predetermined relationship in accordance with an advancing movement of the zoom lens barrel 10. Each sliding plate 51 of the second lens group drive unit 48 is provided with a guide pin 58, while each sliding plates 52 of the frame supporting ring 49 is provided with a guide pin 59. The drive cam ring 30 is provided on its inner peripheral surface with six cam grooves (not shown) in which the guide pins 58 and 59 are respectively fitted. These cam grooves are each formed by cutting away part of the female helicoid 31. The guide pins 58 and 59 are slidably fitted in the corresponding cam grooves. The cam grooves for the guide pins 58 and the cam grooves for the guide pins 59 extend obliquely relative to the optical axis O. Therefore, when the drive cam ring 30 rotates relative to the second linear movement guide ring 33 about the optical axis O, the second and third lens groups L2 and L3 are moved relative to each other along the optical axis O through the guide pins 58 and 59.

The second lens group drive unit 48 is provided with the aforementioned shutter block 53. The shutter block 53 is provided on its inner peripheral surface with a male thread 53a with which a male thread 48b formed on an outer peripheral surface of the second lens frame 48a is engaged. The shutter block 53 is provided with a focusing motor (not shown) which, upon focusing, drives the second lens frame 48a to rotate about the optical axis O relative to the second lens group drive unit 48 in accordance with an object distance signal input from a focusing device (not shown) and a current focal length signal, which causes the second lens frame 48a (the second lens group L2) to move along the optical axis O relative to the shutter block 53 due to the engagement of the female thread 53a and the male thread 48b to bring a subject into focus. The shutter block 53 is provided with a set of shutter blades 55 which also functions an iris diaphragm. The set of shutter blades 55 opens and shuts in accordance with an object brightness signal. The shutter block 53 receives respective drive signals for driving the shutter blades 55 and for driving the second lens frame 48a for focusing, through an FPC (Flexible Printed Circuit) board 60.

The zoom lens barrel 10 is provided in the first extension stage with a focal length detector (encoder). This focal length detector is composed of a code sheet 80 attached to an outer peripheral surface of the first linear movement guide ring 20, and a conductive brush 70 which is fixed to the first outer barrel 17 to slidably contact the code sheet 80. The code sheet 80 is formed as a long strip which extends along a circumference of the first linear movement guide ring 20. When the first outer barrel 17 and the first linear movement guide ring 20 are rotated relative to each other about the optical axis O due to the zooming operation, the conductive brush 70 slides on the code sheet 80 to detect focal length information.

The first linear movement guide ring 20 is provided in the vicinity of the rear end thereof with a circumferential recess 66 for receiving the code plate 80 therein. The code plate 80 is fixed to the base of the recess 66 therealong. The depth of the circumferential recess 66 and the thickness of the code plate 80 are substantially the same, so that the contacting surface (outer surface) of the code plate 80 is substantially flush with a front outer peripheral surface of the first linear movement guide ring 20. The circumferential recess 66 and the three linear guide grooves 28 are positioned on the outer peripheral surface and the inner peripheral surface of the first linear movement guide ring 20, respectively, so that the circumferential recess 66 extends across the linear guide grooves 28 in a circumferential direction. Namely, the circumferential recess 66 and the linear guide grooves 28 are formed so that part of the circumferential recess 66 crosses part of each linear guide groove 28 in a circumferential direction. Consequently, part of the code sheet 80 and part of each linear guide groove 28 are located at the same position in a circumferential direction of the code sheet 80.

The FPC strip 60 is composed of a shutter substrate 60aconnected to the shutter block 53 and a code plate substrate 60b connected to the code sheet 80. The FPC strip 60 has a length long enough to permit the extension and retraction of the zoom lens barrel 10. The other terminals of the FPC strip 60 are connected to a CPU (not shown) provided within the camera body.

Figure 2:
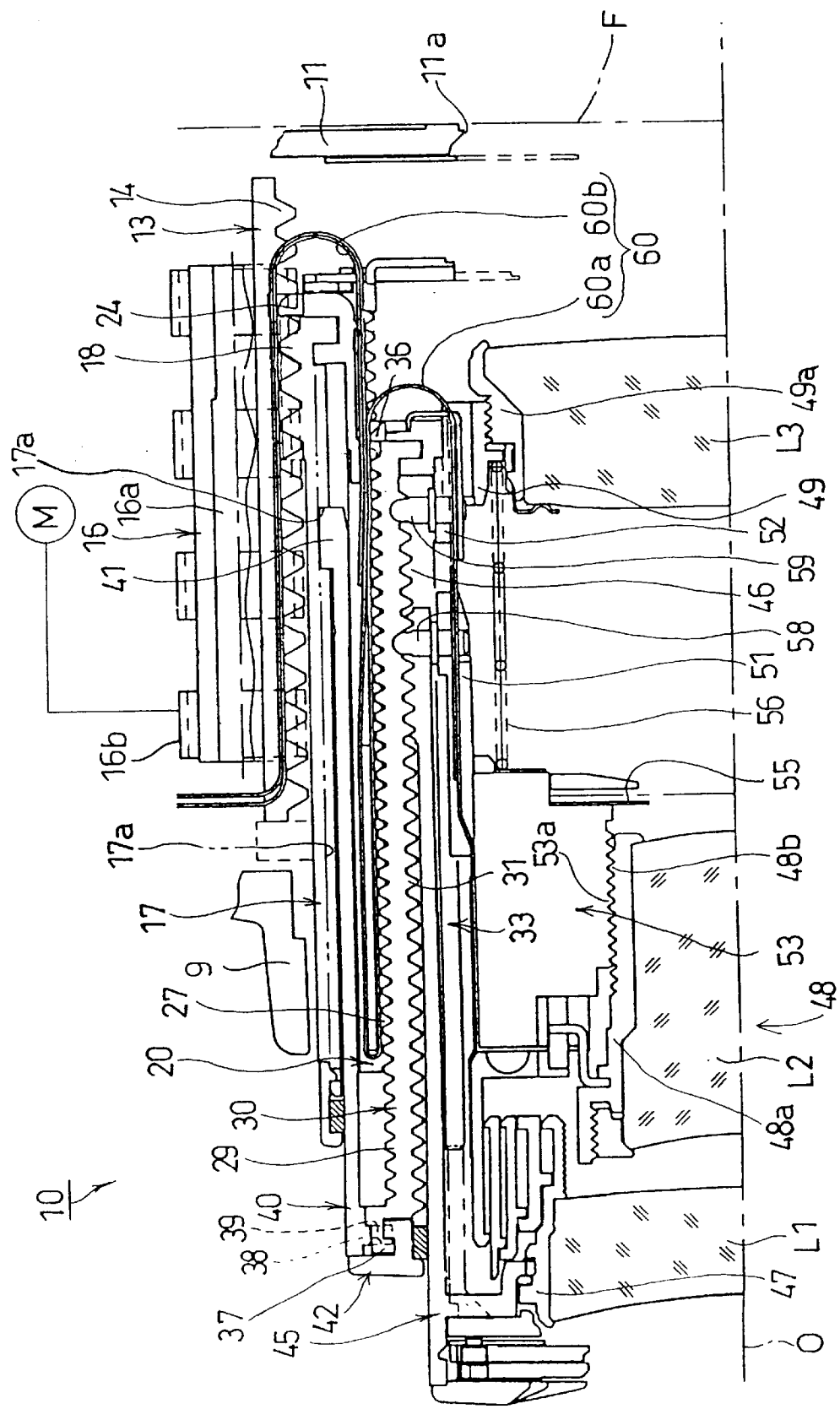
FIG. 2 is a longitudinal sectional view of the zoom lens barrel shown in FIG. 1, at a wide angle extremity.
Figure 3:
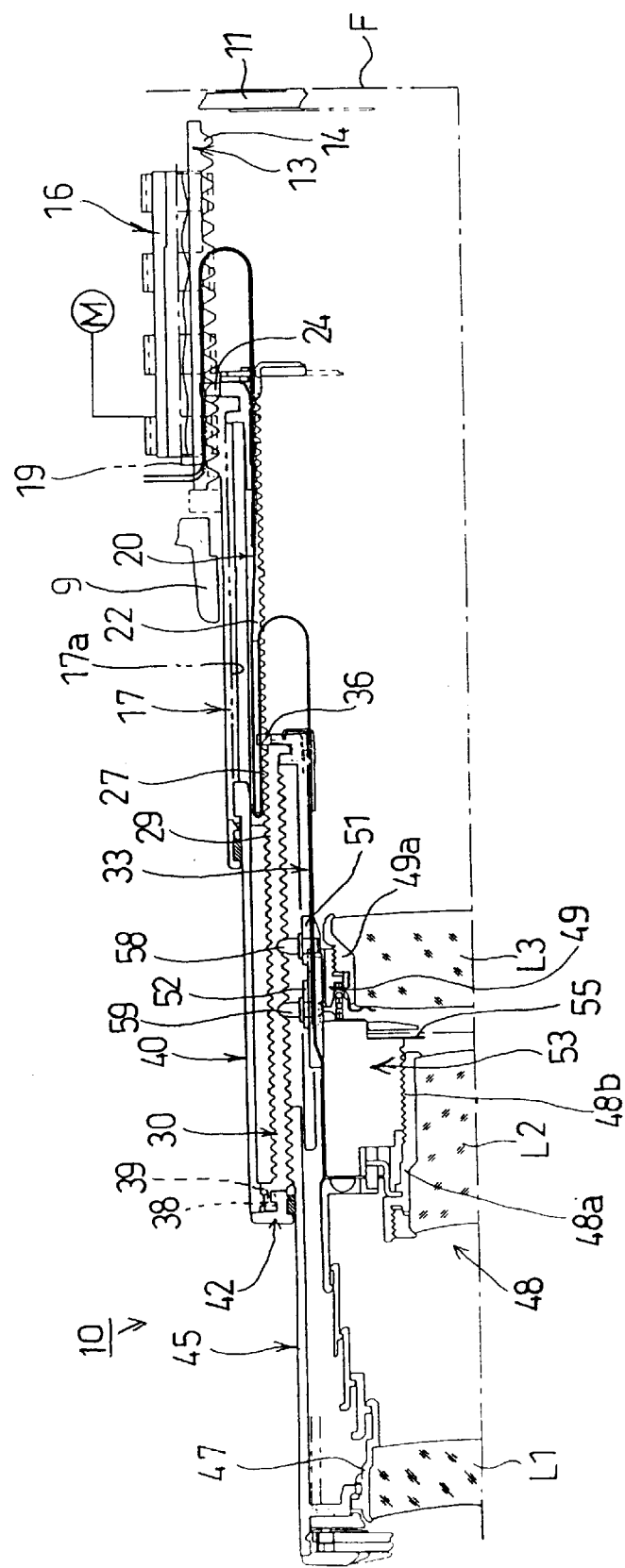
FIG. 3 is a longitudinal sectional view of the zoom lens barrel shown in FIG. 1, at a telephoto extremity.

The zoom lens barrel 10 operates as follows. In the case where the zoom motor M is driven in the extension direction of the zoom lens barrel 10 in the retracted position shown in FIG. 1 or in the wide-angle extremity shown in FIG. 2, the first outer barrel 17 is rotated and advanced from the stationary barrel 13. Consequently, the first linear movement guide ring 20 is moved forwardly together with the first outer barrel 17 while being linearly guided by the stationary barrel 13. As a result, the drive cam ring 30 is advanced together with the second outer barrel 40 from the first linear movement guide ring 20 while rotating in the same direction as that of the first outer barrel 17. At the same time, the linear movement of the second linear movement guide ring 33 in the direction of the optical axis O, together with the drive cam ring 30 occurs. When the drive cam ring 30 advances while rotating, the second lens group L2 and the third lens group L3 are moved forwardly in the direction of the optical axis O while varying the distance between the second and third lens groups L2 and L3 within the second extension stage, in accordance with the engagement of the guide pins 58 and 59 with the corresponding cam grooves of the drive cam ring 30. Further, the third outer barrel 45 which is linearly guided by the second linear movement guide ring 33 is moved forwardly in the direction of the optical axis O in accordance with the rotation of the drive cam ring 30, so that the first lens group L1 is moved forwardly relative to the second and third lens groups L2 and L3. In the case where the zoom motor M is driven in the retraction direction of the zoom lens barrel 10 at the telephoto extremity shown in FIG. 3, the zoom lens barrel 10 operates in the opposite way to the above-mentioned operation.

As can be seen from the foregoing, in the three extension stage type of zoom lens barrel 10, the zooming operation is carried out by varying the distances of the first, second and third lens groups L1, L2 and L3 from the film surface F while varying the relative distances among the lens groups L1, L2 and L3, and the focusing operation is carried out by moving the second lens group L2 in the direction of the optical axis O by means of the focusing motor M.

Figure 5:
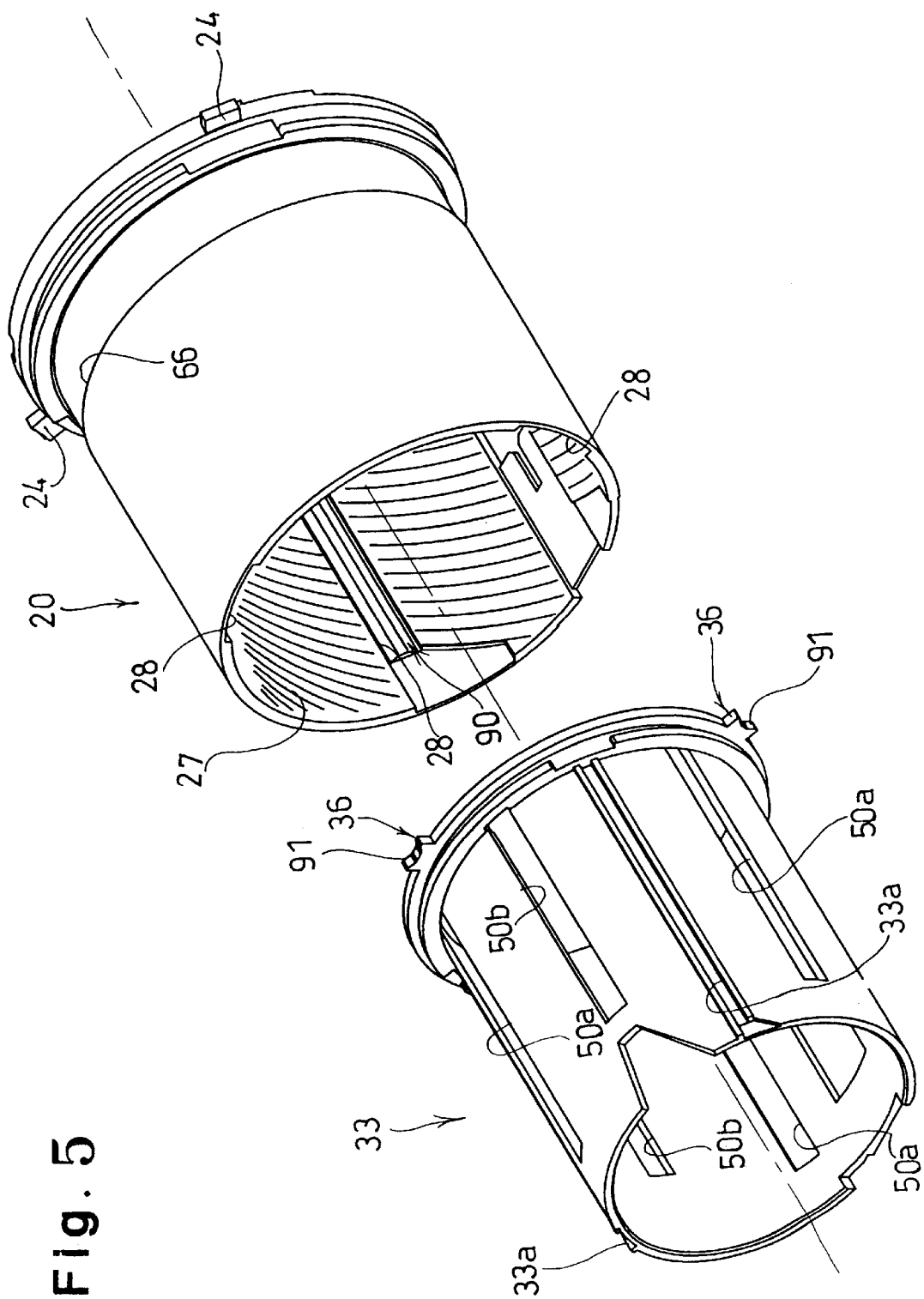
FIG. 5 is an exploded perspective view of first and second linear movement guide barrels in the zoom lens barrel shown in FIG. 1.

A linear guiding mechanism which is composed of the aforementioned linear guide grooves 28 and the guide projections 36 for guiding the second linear movement guide ring 33 in the direction of the optical axis O relative to the first linear movement guide ring 20 without allowing second linear movement guide ring 33 to rotate relative to the first linear movement guide ring 20 will be hereinafter discussed with reference to FIGS. 5 and 6. Since all the pairs of the linear guide grooves 28 and the guide projections 36 are the same, only one of the pairs will be hereinafter discussed.

The linear guide groove 28 is formed on an inner peripheral surface of the first linear movement guide ring 20 by cutting away part of the female helicoid 27. The linear guide groove 28 is provided with a pair of opposing walls 71a and 71b which are in parallel to each other.

Figure 6:
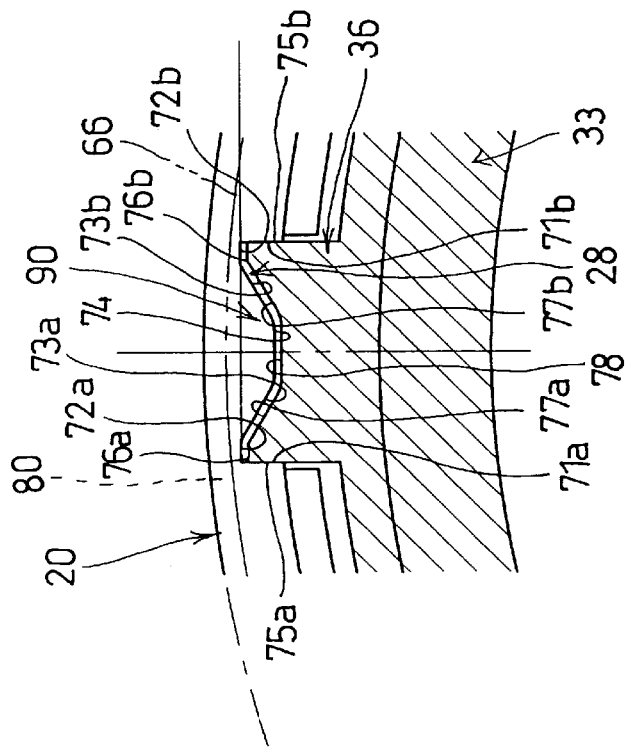
FIG. 6 is a cross sectional view of connected portions of the first and second linear movement guide barrels shown in FIG. 5, showing a state of engagement between a linear guide groove and a corresponding guide projection.

As can be clearly seen in FIG. 6, the linear guide groove 28 is provided at the base thereof with a raised portion 90 which is radially raised towards the optical axis O by a predetermined height such that the linear guide groove 28 has a substantially M-shaped profile in cross section along a plane extending perpendicularly to the optical axis O. The raised portion 90 linearly extends almost entirely along the linear guide groove 28 and has uniform trapezoidal cross section along the linear guide groove 28, i.e., in the direction of the optical axis O.

The linear guide groove 28 is provided, at the base thereof on respective sides of the raised portion 90, with side bottom surfaces 72a and 72b which extend substantially perpendicular to the opposing walls 71a and 72b, respectively. The outer end of the opposing wall 71a is connected with the side bottom surface 72a, while the outer end of the opposing wall 71b is connected with the side bottom surface 72b. The linear guide groove 28 is further provided at the base along the center thereof with a center apex surface 74 which is substantially parallel with the side bottom surfaces 72a and 72b. An inclined surface 73a is formed to connect the center apex surface 74 with the side bottom surfaces 72a, while an inclined surface 73b is formed to connect the center apex surface 74 with the side bottom surfaces 72b. The inclined surfaces 73a and 73b and the center apex surface 74 together form the overall surface of the raised portion 90.

The guide projection 36 is formed so as to be slidably fitted in the linear guide groove 28 in an appropriate manner.

Namely, the length of the guide projection 36 between respective side walls 75a and 75b of the guide projection 36 is determined such that the guide projection 36 is slidable in the linear guide groove 28 in an appropriate manner. Further, the guide projection 36 is provided with a concave portion 91 (see FIG. 5) whose shape is determined to correspond to the shape of the bottom of the linear guide groove 28, so that the guide projection 36 also has substantially an M-shaped profile in cross section along a plane extending normal to the optical axis O. The concave portion 91 is provided with side surfaces 76a and 76b, inclined surfaces 77a and 77b, and a center bottom surface 78 which correspond to the side surfaces 72a and 72b, the inclined surfaces 73a and 73b, and the center apex surface 74, respectively.

Figure 7:
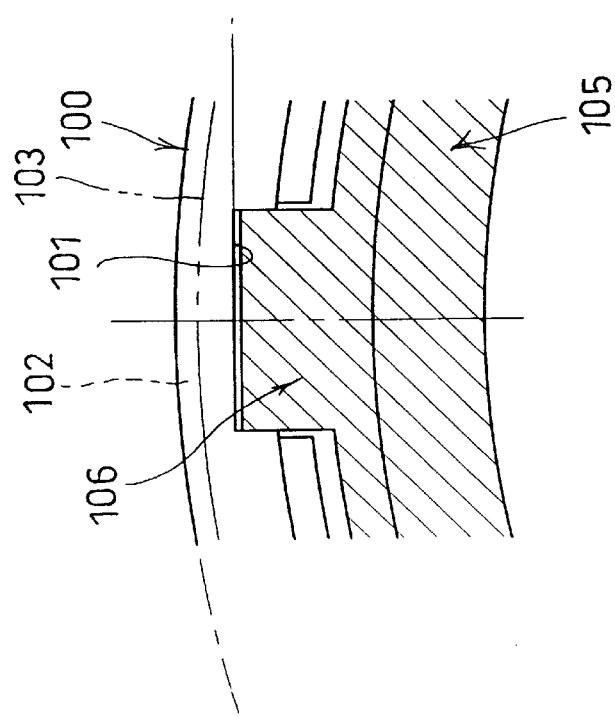
FIG. 7 is a cross sectional view of connected portions of two linear movement guide barrels in a conventional zoom lens barrel, showing a state of engagement between a linear guide groove and a corresponding guide projection.

In the state where the guide projection 36 is properly fitted in the linear guide groove 28, since the shape of the guide projection 36 corresponds to the shape of the linear guide groove 28, the second linear movement guide ring 33 is stably guided linearly in the direction of the optical axis O relative to the first linear movement guide ring 20. Furthermore, as can be understood by comparing the structure shown in FIG. 6 with the conventional structure shown in FIG. 7, although the amount of engagement of the guide projection with the linear guide groove is identical in either case, the side bottom surfaces 72a and 72b of the linear guide groove 28 in the present embodiment are positioned closer to the bottom of the circumferential recess 66, which makes it possible to form the first linear movement guide ring 20 thinner as a whole than the conventional outer barrel 100. Although the first linear movement guide ring 20 is formed thin, a sufficient thickness is ensured between the linear guide groove 28 and the circumferential recess 66, which assures sufficient strength of the first linear movement guide ring 20 at the circumferential recess 66. Consequently, even when the conductive brush 70 slides on the code sheet 80 by pressing the same, the code sheet 80 is hardly deformed nor distorted, which makes it possible to carry out a precise focal length detecting operation. According to the linear guiding mechanism of the present embodiment, since it is not necessary to decrease the amount of engagement of the guide projection 36 with the linear guide groove 28 for the purpose of forming the first linear movement guide ring 20 thin, the original function of the linear guiding mechanism can be maintained.

Although the circumferential groove 66 is formed on the first linear movement guide ring 20 in the illustrated embodiment, it is possible for the circumferential groove 66 not to be formed, and the code sheet 80 can be directly fixed onto the first linear movement guide ring 20, as long as the raised portion 90 is formed at the base of each linear guide groove 28.

The raised portion 90 can be formed at the base of each linear guide groove 28 only at the portion thereof which is located at the same position as that of the part of the circumferential groove 66 which crosses each linear guide groove 28 thereat in a circumferential direction.

Although the code sheet 80 and the circumferential groove 66 extend in a circumferential direction on the first linear movement guide ring 20 in the illustrated embodiment, they can extend in parallel with the optical axis O as long as at least part of the circumferential groove 66 is located at the same position as that of any linear guide groove 28 in a circumferential direction.

In the illustrated embodiment, the raised portion 90 is formed at the base of each linear guide groove 28 to have a trapezoidal cross section with the summit thereof positioned closer to the optical axis O, and each of the guide projections 36 is correspondingly formed to have the concave portion 91. Such shape of each linear guide groove 28 or the concave portion 91 is effective to ensure a sufficient thickness of the first linear movement guide ring 20 along each linear guide groove 28 without deteriorating the slidable engagement of the guide projections 36 with the linear guide grooves 28. However, the raised portion 90 and the concave portion 91 can be formed in any other shape. For instance, each linear guide grooves 28 may be provided at the base thereof with a raised portion having a semicircular cross section along a plane extending perpendicular to the optical axis O, and the concave portion 91 may be formed to have a corresponding semi-circular cross section.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A linear guiding mechanism of a zoom lens barrel, comprising:

a first cylindrical member provided on an inner periphery thereof with at least one linear guide groove which extends parallel to an optical axis, a code sheet for detecting a focal length being fixed to an outer periphery of said first cylindrical member; and a second cylindrical member provided on an outer surface thereof with at least one guide projection which is fitted in said at least one linear guide groove, respectively, wherein at least part of said code sheet and at least part of said at least one linear guide groove are located at the same position in a circumferential direction of said code sheet, and wherein each of said at least one linear guide groove comprises a raised portion which is radially raised from the base of said linear guide groove towards said optical axis.

2. The linear guiding mechanism according to claim 1, wherein each of said at least one guide projection comprises a concave portion, the shape of which corresponds to said raised portion.

3. The linear guiding mechanism according to claim 1, wherein each of said at least one linear guide groove has a substantially M-shaped profile in cross-section along a plane extending perpendicularly to said optical axis.

4. The linear guiding mechanism according to claim 1, wherein each of said at least one linear guide groove has a uniform cross-section in the direction of said optical axis.

5. The linear guiding mechanism according to claim 1, wherein said code sheet is in the shape of a strip extending along a circumference of said first cylindrical member.

6. The linear guiding mechanism according to claim 1, wherein said first cylindrical member comprises a circumferential recess formed on said outer periphery of said first cylindrical member, said code sheet being fixed to the base of said circumferential recess therealong.

7. The linear guiding mechanism according to claim 1, wherein said first cylindrical member comprises a female helicoid formed on an inner periphery of said first cylindrical member, wherein said at least one linear guide groove is formed by cutting away part of said female helicoid.

8. The linear guiding mechanism according to claim 1, wherein said first cylindrical member is guided in a direction of said optical axis without rotating about said optical axis.

9. The linear guiding mechanism according to claim 1, further comprising:

an outer movable barrel in which said first cylindrical member is positioned so that said outer movable barrel is rotatable about said optical axis relative to said first cylindrical member, wherein a conductive brush which slidably contacts said code plate is secured to said outer movable barrel.

10. A linear guiding mechanism of a zoom lens barrel for guiding a second barrel relative to a first barrel in a direction of an optical axis without allowing said second barrel to rotate about said optical axis relative to said first barrel, wherein said second barrel comprises a plurality of guide projections each extending radially in a direction apart from said optical axis, and wherein said first barrel comprises:

a plurality of linear guide grooves formed on an inner periphery of said first barrel to extend in said optical axis direction;

a circumferential groove formed on an outer periphery of said first barrel along a circumference of said first barrel, said plurality of guide projections being respectively fitted in said plurality of linear guide grooves in a slidable manner in a direction of said optical axis; and a code sheet for detecting a focal length being fixed to a bottom of said circumferential groove therealong, wherein at least part of said circumferential groove crosses at least part of each of said plurality of linear guide grooves in a circumferential direction, and wherein each of said plurality of linear guide grooves comprises a raised portion which is radially raised from the base of said linear guide groove towards said optical axis.

11. A linear guiding mechanism of a zoom lens barrel, comprising:

a first cylindrical member provided on an inner periphery thereof with a plurality of linear guide grooves extending parallel to an optical axis, a code sheet for detecting a focal length being fixed to an outer periphery of said first cylindrical member; and a second cylindrical member provided on an outer surface thereof with a corresponding plurality of guide projections which are fitted in said plurality of linear guide groove, respectively;

wherein at least part of said code sheet crosses at least part of each of said plurality of linear guide grooves in a circumferential direction, and wherein each of said plurality of linear guide grooves comprises a raised portion which is radially raised from the base of said linear guide groove towards said optical axis.

* * * * *